United States Patent
Kurts et al.

(10) Patent No.: US 7,590,913 B2
(45) Date of Patent: Sep. 15, 2009

(54) METHOD AND APPARATUS OF REPORTING MEMORY BIT CORRECTION

(75) Inventors: Tsvika Kurts, Haifa (IL); Moty Mehalel, Haifa (IL); Julius Mandelblat, Haifa (IL); Alexander Gendler, Kiryat Beyalik (IL)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 11/320,496

(22) Filed: Dec. 29, 2005

(65) Prior Publication Data

US 2007/0165041 A1    Jul. 19, 2007

(51) Int. Cl.
*H04L 1/00*   (2006.01)

(52) U.S. Cl. ............. 714/746; 714/760; 714/761; 714/762; 714/763; 714/764

(58) Field of Classification Search ............ 714/746, 714/760–765
See application file for complete search history.

(56) References Cited

U.S. PATENT DOCUMENTS 3,999,051 A    12/1976  Petschauer
6,615,374 B1    9/2003  Moran
7,346,812 B1 *  3/2008  Wickeraad ............ 714/48
2007/0094569 A1 * 4/2007  Thayer et al. ........... 714/763

FOREIGN PATENT DOCUMENTS

WO    WO 83/02164 A    6/1983

OTHER PUBLICATIONS

IBM Technical Disclosure Bulletin, ECC Controller for Memories, Aug. 1, 1989, vol. 32, issue No. 3B.*
International Search Report for International Application PCT/US2006/047301 mailed on Nov. 14, 2007.
U.S. Appl. No. 11/039,742, filed Jan. 19, 2005, Mehaiel.

* cited by examiner

*Primary Examiner*—Guy J Lamarre
*Assistant Examiner*—Sam Rizk
(74) *Attorney, Agent, or Firm*—Pearl Cohen Zedek Latzer LLP

(57) ABSTRACT

Briefly, a method, main processing unit and a computer system to report a failure in a bit of a memory line by updating first and second counters for a first time and a second time correction of bit failures in a line, respectively. The updating of first and second counters after a third time correction of bit failure in the line is disabled.

25 Claims, 6 Drawing Sheets

| | | Cache line | | | | | | CACHE_MC_STATUS | | | | | SBF | |
|---|---|---|---|---|---|---|---|---|---|---|---|---|---|---|
| Time | Action | Cache entry | ECN1 | ECN0 | VAL | OVR | OVF | ESER_CNT | Model specific | MCACOD | MC_A DDR | CNT1 | CNT2 | |
| T0 | Reset | | 0 | 0 | 0 | 0 | 0 | 0 | 0 | 0 | 0 | 0 | 0 | |
| T1 | Write | a | 0 | 0 | 1 | | | | | | | 0 | 0 | |
| T2 | Correction | a | 0 | 1 | 1 | 0 | 0 | 1 | "0007" | "010A" | a | 1 | 0 | |
| T3 | Correction | a | 0 | 1 | 1 | 0 | 0 | 1 | "0007" | "010A" | a | 1 | 0 | |
| T4 | Write | a | 1 | 0 | 1 | | | | | | | | | |
| T5 | Correction | a | 1 | 1 | 1 | 0 | 0 | 0 | "0008" | "100E" | 0 | 1 | 1 | |
| T6 | Correction | a | 1 | 1 | 1 | 0 | 0 | 0 | "0008" | "100E" | 0 | 1 | 1 | |

| | Cache line | | | | CACHE_MC_STATUS | | | | | | SBF | |
|---|---|---|---|---|---|---|---|---|---|---|---|---|
| Time | Action | Address | ECN1 | ECN0 | VAL | OVR | OVF | ESER_CNT | Model specific | MCACOD | MC4_ADDR | Comments | CNT1 | CNT2 |
| T500 | Detected all SBF | | | | | | | | | | | | 127 | 127 |
| T501 | Write | d | 0 | 0 | | | | | | | | Write into Cache | | |
| T502 | Correction | d | 0 | 1 | 1 | 0 | 0 | 1 | "0007" | "010A" | d | MCACODE: SingECC error | 128 | 127 |
| T503 | Correction | d | 0 | 1 | 1 | 0 | 0 | 1 | "0007" | "010A" | d | No change | 128 | 127 |
| T504 | Write | d | 0 | 0 | | | | | | | | Write Into Cache | | |
| T505 | Correction | d | 0 | 1 | 1 | 1 | 0 | 2 | "0007" | "010A" | d | MCACODE: SingECC error | 129 | 127 |
| T506 | Write | d | 0 | 0 | | | | | | | | Write into Cache | | |
| T507 | Correction | d | 0 | 1 | 1 | 1 | 0 | 3 | "0007" | "010A" | d | MCACODE: SingECC error | 130 | 127 |
| T508 | Write | d | 0 | 0 | | | | | | | | Write Into Cache | | |
| T509 | Correction | d | 0 | 1 | 1 | 1 | 0 | 4 | "0007" | "010A" | d | MCACODE: SingECC error | 131 | 127 |

*FIG. 7*

METHOD AND APPARATUS OF REPORTING MEMORY BIT CORRECTION

BACKGROUND OF THE INVENTION

Mobile devices such as, for example, laptop computers, handheld devices, personal data assistance (PDA), data terminals, pocket personal computers and the like may include a processor and/or a computing platform. The processor and/or the computing platform may consume high battery power which may reduce the operation hours of such devices. In order to reduce the high power consumption from the battery, a power control mechanism to control power consumption of the processor may be used. The power control mechanism may reduce the power consumption by providing a lower voltage and/or a lower frequency to the processor and/or a computing platform. The low voltage may cause recoverable and/or unrecoverable errors in the processor and/or in a cache memory the computing platform.

The processor and/or the computing platform may include an on-die cache Memory. Random Access Memory (RAM) cells of the cache memory may limit the lowest possible voltage at which the processor may be operated. The RAM cells in on-die processor cache memories may be manufactured from devices designed with the smallest possible size supported by the fabrication process used to manufacture the processor, and the devices may be, as a side effect, very sensitive to variations that normally occur during manufacturing, causing a few cells to deviate significantly from the average in terms of the minimum voltage required for them to operate correctly. The variations may cause a failure of a bit in the cache memory line.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 5 is a schematic illustration of a time table to reflect changes in time in a status of registers according to exemplary embodiments of the present invention, and helpful for demonstrating the method of FIG. 4;

FIG. 7 is a schematic illustration of a time table to reflect changes in time in a status of registers according to exemplary embodiments of the present invention; and helpful in demonstrating the method of FIG. 6;

Figure 1:
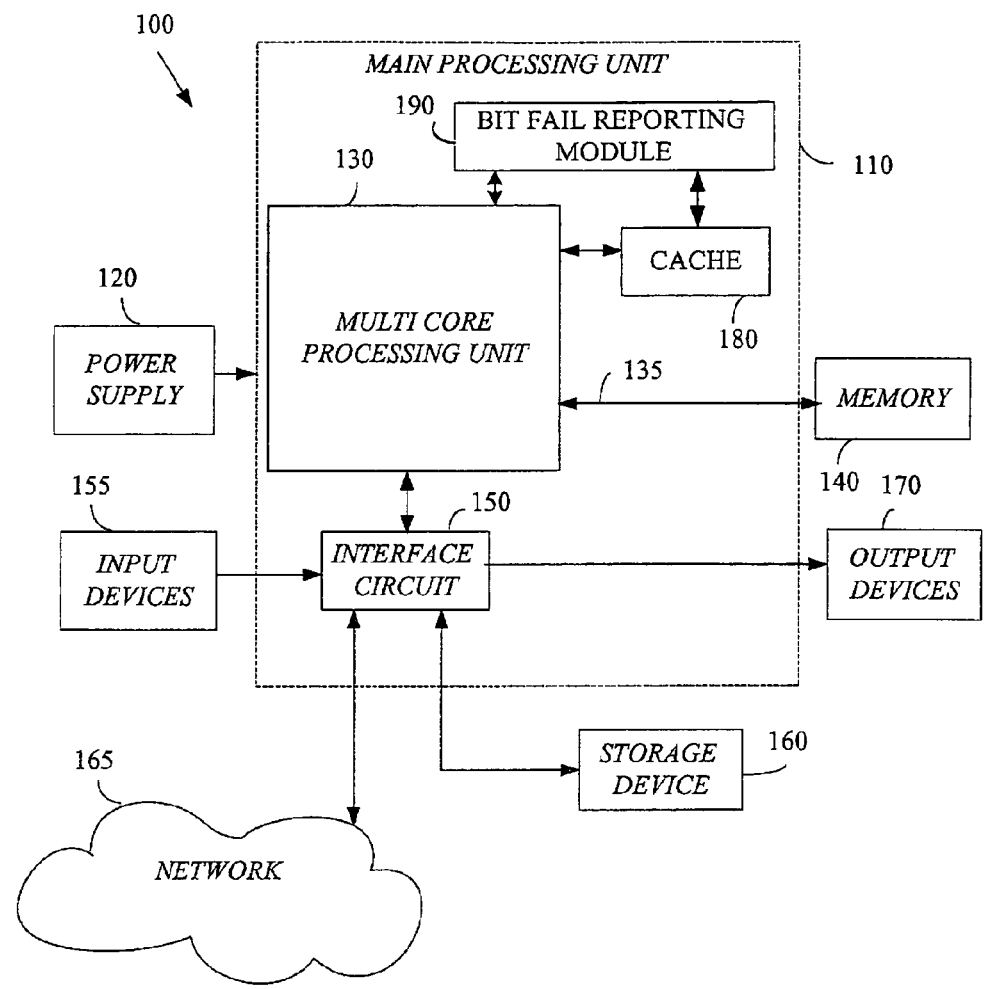
FIG. 1 is a schematic block diagram of a computer system according to an exemplar embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of instructions" describes two or more instructions.

It should be understood that the present invention may be used in a variety of applications. Although the present invention is not limited in this respect, the circuits and techniques disclosed herein may be used in many apparatuses such as computer systems, processors, CPU, memories, chipset graphics controllers or the like. Processors intended to be included within the scope of the present invention include, by way of example only, a reduced instruction set computer (RISC), a processor that have a pipeline, a complex instruction set computer (CISC) and the like.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Turning firstly to FIG. 1, a block diagram of a computer system 100 according to an exemplary embodiment of the invention is shown. Although the scope of the present invention is not limited in this respect, computer system 100 may be a personal computer (PC), a personal digital assistant (PDA), an Internet appliance, a cellular telephone and/or any other computing device. In one exemplary embodiment of the invention, computer system 100 may include a main processing unit 110 powered by a power supply 120. Main processing unit 110 may include a multi core processing unit 130 electrically coupled by a system interconnect 135 to a memory device 140 and one or more interface circuits 150. For example, the system interconnect 135 may be an address/data bus, if desired. It should be understood that interconnects other than buses may be used to connect multi core processing unit 130 to memory device 140. For example, one or more dedicated lines and/or a crossbar may be used to connect multi processing unit 130 to memory device 140. Memory device 140 may include a dynamic random access memory (DRAM), a non-volatile memory, or the like. In one example, memory device 140 may store a software program which may be executed by multi core processing unit 130, if desired.

Although the scope of the present invention is not limited in this respect, interface circuit(s) 150 may include an Ethernet interface and/or a Universal Serial Bus (USB) interface, and/or the like. In some exemplary embodiments of the invention, one or more input devices 155 may be connected to interface circuits 150 for entering data and commands into the main processing unit 110. For example, input devices 160 may include a keyboard, mouse, touch screen, track pad, track ball, isopoint, a voice-recognition system, and/or the like.

Although the scope of the present invention is not limited in this respect, the output devices 170 may be operably coupled to main processing unit 110 via one or more of interface circuits 150 and may include one or more displays, printers, speakers, and/or other output devices, if desired. For example, one of the output devices may be a display. The display may be a cathode ray tube (CRT), a liquid crystal display (LCD), a plasma display or any other type of graphic display.

According to some embodiments of the invention, computer system 100 may include one or more storage devices 160. For example, computer system 100 may include one or more hard drives, one or more compact disk (CD) drives, one or more digital versatile disk drives (DVD), and/or other computer media input/output (I/O) devices, if desired.

Exemplary computer system 100 may exchange data with other devices via a network connection to a network 165. The network connection may include any type of network connection, such as, for example, an Ethernet connection, a digital subscriber line (DSL), a telephone line, a coaxial cable, a wireless network interface card, etc. Network 165 may be any type of network, such as, for example, the Internet, a telephone network, a cable network, a wireless network such as, for example, a network complying IEEE standard 802.11 a/b/g, 1999, and/or the like. According to exemplary embodiment of the present invention the wireless network interface card (NIC) may provide a network connectivity to the computer system 100, if desired.

According to some embodiments of the invention, multi core processing unit 130 may include one or more CPU's (not shown), if desired. Multi core processing unit 130 may include and/or be coupled to a cache memory 180, such as, for example, a level two (L2) cache, or the like. In some embodiment of the invention, cache memory 180 may include a plurality of lines.

A write or read operation on a cache memory line may fail because one of the bits of the cache memory line may include an error. For example, some failures may be experienced at all times and some may occur only at low voltage.

According to embodiments of the present invention, a single bit fail in a line which includes the error may be detected and/or corrected by error correcting code ECC) information. For example, ECC information may be stored in one of the registers of a bit fail reporting module 190 with a tag and a line of cache memory 180. When an entry of cache memory 180 is read, the tag and the line may be checked against their stored ECC data The ECC may correct and/or fix the error in the bit. For simplicity of reading, the corrected bit may be referred to herein as a single bit fix (SBF). The SBF may be reported to bit fail reporting module 190. Although the scope of the present invention is not limited in this respect, the ECC may operate on a range of 32 bytes and cache 180 may include 64 bytes. Thus, according to this example, the ECC may detect two bits per cache line.

According to some embodiment of the invention, bit fail reporting module 190 may include registers and counters. Bit fail reporting module 190 may report SBF to an operating system (OS) of computer system 100, if desired. It should be understood that, according to embodiments of the present invention, bit fail reporting module 190 may be implemented by hardware, or by software, or by any combination of hardware and/or software.

Figure 2:
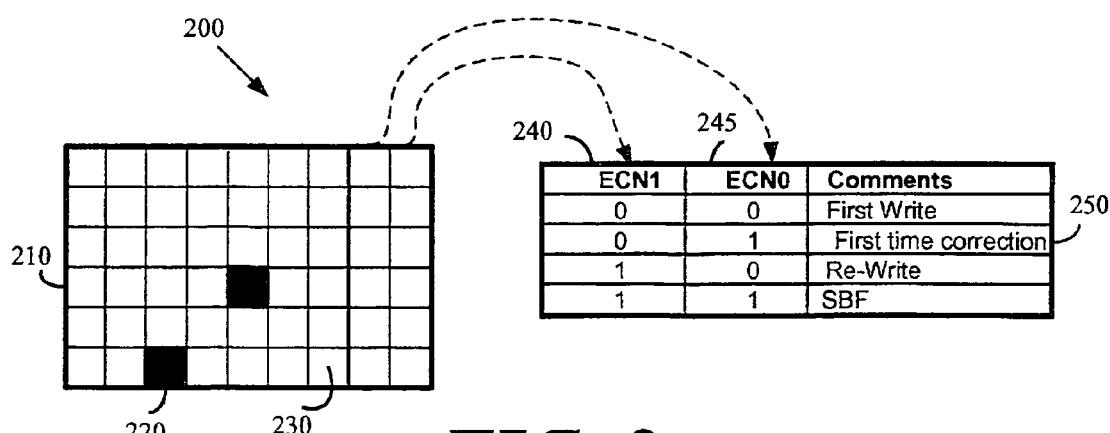
FIG. 2 is a schematic diagram demonstrating a memory and control bits according to some exemplary embodiments of the present invention.

Turning to FIG. 2, a schematic block diagram of a memory 200 according to some exemplary embodiments of the present invention is shown. According to some exemplary embodiments of the invention, memory 200 may include a cache.

Although the scope of the present invention is not limited in this respect, the cache memory may include a Level 1 (L1) cache and/or a level 2 (L2) cache and/or a level 3 cache, for example, a Large Level Cache (LLC), if desired. Memory 200 may include lines 210, which may include bits 230. According to one exemplary embodiment of the invention, some bits may fail by flipping their state. For example, bit 220 may change its value from "0" to "1" (or vice versa). With embodiments of the present invention, the failed bit may be corrected by the ECC and may be referred to as SBF.

Although the scope of the present invention is not limited in this respect, lines 210 of memory 200 may include one or more status bits, for example, status bits 240 and 245. Status bits 240 and 245 may be depicted as ECN1 and ECN0, respectively. ECN1 and ECN0 may designate detection and correction of SBF in lines 210. For example, ECN1 (e.g., status bit 240) may be used to count ECC history. It should be understood that the change in values of ECN1 and ECN0 allows to track the line status (e.g. line 210) according to the flow of an algorithm of detecting, correcting and reporting the SBF, although the scope of the present invention is not limited in this respect.

According to some exemplary embodiments of the invention, a status bits state table 250 may show values of status bits 240 and 245 with regard to writing to lines 210 of memory 200 and with regard to the flow of the algorithm of detecting, correcting and reporting SBF. In a first line of table 250, status bits ECN1 and ECN0 may be at "0", which may designate first time writing into a bit in a line and/or to the line. If a correction to the bit has been made, for example, by the ECC, the ECN0 status bit may be updated from "0" to "1", as demonstrated by the comment "first time correction" in the second line of table 250. If the second write to a line having a corrected bit is successful (third line of table 250), the ECN0 status bit may be update from "1" to "0" and the ECN0 status bit may be update from "0" to "1". If a second bit fail occurs in the same cache line (last line of table 250), then ECN1 may be updated from "0" to "1".

Although the scope of the present invention is not limited in this respect, when the status of both the ECN0 and ECN1 status bits is "1", this may indicate on a hard failure of the cache line. The line with the failure may be reported as an SBF. According to some embodiments of the present invention, the line marked as SBF in table 250 may be disabled for writing.

Figure 3:
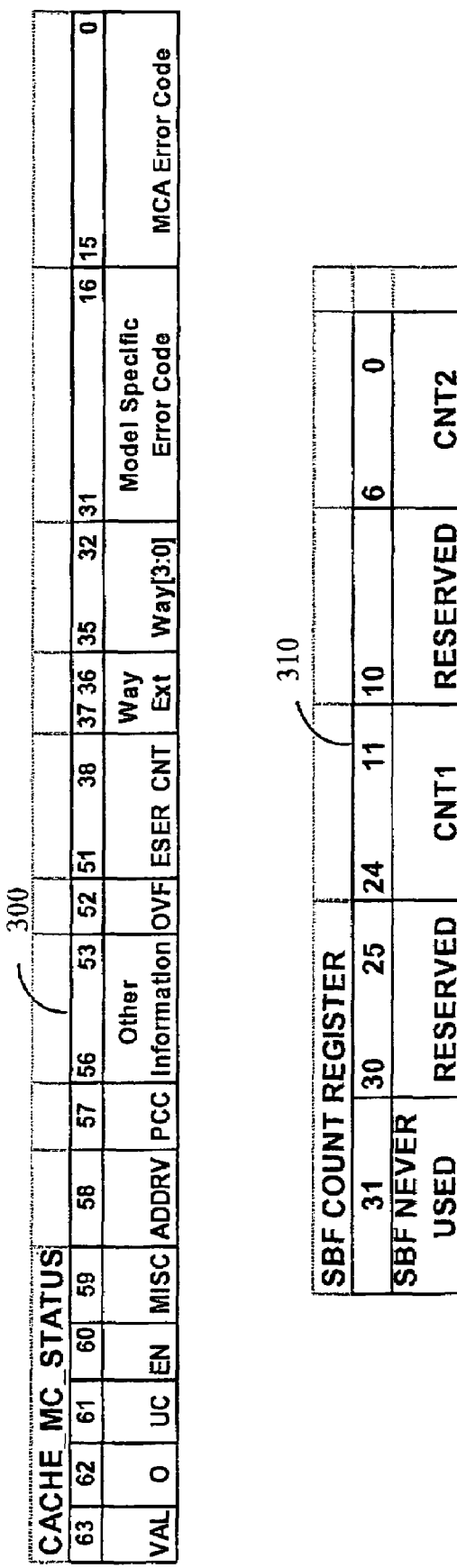
FIG. 3 is a schematic illustration of an architecture of a machine check register and a soft bit fix count register, according to some exemplary embodiments of the invention.

Turning to FIG. 3, an illustration of a machine check architecture (MCA) register 300 and a soft bit fix count register 310 according to some exemplary embodiments of the present invention is shown. Although the scope of the present invention is not limited in to this embodiment, MCA register 300 may be one of the registers of a machine check architecture (MCA) of a processor, for example, a cache status register (CACHE_MC_STATUS).

According to this exemplary embodiment of the invention, MCA register 300 may include the following functions: bits 0 to 15 may indicate an MCA Error Code; bits 16 to 31 may indicate a Model Specific Error Code, for example, error codes of SBF, ECC and the like; bits 32 to 35, 36 and 37 may indicate status of ways of a cache memory (e.g. memory 200); bits 38 to 51 may be used as an ECC counter to count a soft error rate (ESER_CNT); bit 52 may be used as an overflow (OVF) bit of the ESER_CNT; bits 53 to 56 may be reserved for any other information; bit 57 may indicate Processor Context corrupts (PCC); for example, the PCC bit may be set to "1" if a damaging error occurs in the backside bus logic (BBL); bit 58, an ADDRV bit, may indicate that CACHe_MC_ADDR register exists; bit 59 may indicate that MISC register is not set; bit 60 EN may indicate that an error is enabled; bit 61 may indicate, for example, that the processor was not able to correct the error condition and/or that a Serious Error that has damaged the BBL unit has occurred; bit 62 may indicate that an MCA error occurred while the result of a previous error was still in the error reporting register bank, and bit 63 may indicate that the information within other status registers is valid. It should be understood that MCA register 300 may be implemented by a hardware and/or by software and/or by any combination of hardware and software.

In at least one exemplary embodiment of the present invention, SBF count register 310 may count defected lines that were corrected by the SBF mechanism. SBF count register 310 may include a first counter, CNT2, to count corrected errors that repeated a second time in a cache line(e.g., bits 6:0) and a second counter, CNT1, to count corrected errors that happened for the first time in a cache line (e.g., bit 24:11). Other bits of SBF count register 310 (e.g., bits 10:7 and 30:25) may be reserved. Bit 31 of register 310 may reflect a value of a SBF_NEVER_USED fuse which may be set if no SBF has been detected during production and/or testing, although the scope of the present invention is not limited to this example.

Figure 4:
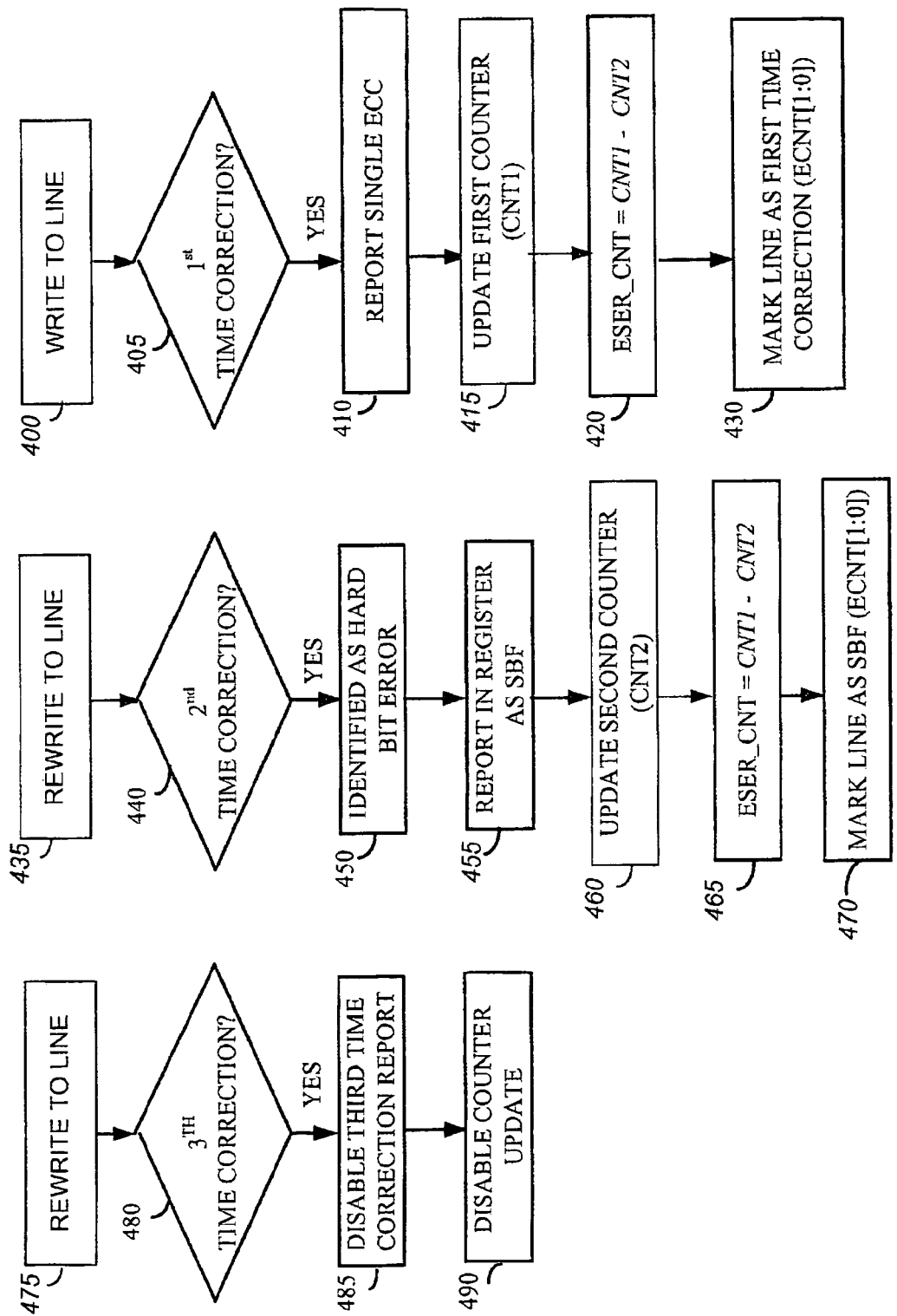
FIG. 4 is a schematic flowchart of a method of managing a single bit fail in a memory line according to exemplary embodiments of the invention.

Turning to FIG. 4 and FIG. 5. FIG. 4 is a method of managing a single bit fail (SBF) according to exemplary embodiments of the invention. FIG. 5 illustrates a time table 500 showing changes in time in the status of registers of exemplary embodiments of the present invention, in time, and helpful for demonstrating the method of FIG. 4. According to an exemplary embodiment of the invention, table 500 may show cache line status bits ECN1 and ECN0 (e.g., bits 240, 245) and a report register (e.g., CACHE_MC_STATUS register 300) having counters, flags, status and/or information fields.

According to this exemplary embodiment, at time T0 the cache status bits ECN0, ECN1 and report register counters and fields may be reset to "0". At time T1, a write to the cache (e.g. cache 200) may be done (text block 400). At time T2, a read and a correction of the cache line may be done. If it is a first time correction (decision block 405 of FIG. 4) then the first time correction of the line may be reported to the report register (text block 410). A first counter (e.g., CNT1) may count the error correction and may be updated by changing its status from "0" to "1", if desired (text block 415).

According to this example, an ESER_CNT (e.g., counter of CACHE_MC_STATUS register as is shown in table 500) may display the result a binary minus operation of CNT1–CNT2. Counters CNT1 and CNT2 may be at SBF count register 310, if desired (text block 420). The cache line may be marked as first time corrected and/or as a soft fail (text block 430). For example, the marking of first time correction may be done by updating cache status bits ECNT [1:0], by writing into field "Model Specific" of the report register the value "0007" and/or by writing to field "MCAOD" of the report register the value "010A", if desired.

According to this example, at time T2 a read operation of the cache line may be done and the ECC mechanism may correct a bit fail in the cache line. At time T3, another read and correction to the cache line may be done. It should be understood that updating of the first and second counters of this reading and correcting of the cache line (e.g., of status bits ECN0 and ENC1) may be disabled for example, by the ECC mechanism, and the reporting at the report register may be disabled too. At time T4, a rewrite to the corrected cache line may be done (text block 435). The second counter (e.g., CNT2 of SBF count register 310) may be updated, for example, by changing its state from "0" to "1". ESER_CNT counter may display CNT1–CNT2 which may represent a decrement of ESER_CNT, if desired. At time T5, a read and correction of this cache line may be done. If the correction is a second time correction of the same cache line (decision block 440) then the failure may be identified as a hard bit error (text block 450). The ECN1 status bit of the cache line may be incremented and together with ECN0, the failure may be reported as SBF (text block 455). The second counter (e.g., CNT2) may be updated, or example by changing its state from "0" to "1", if desired (text block 460). In the report register, ESER_CNT may be updated according to the state of the first and second counters (e.g., CNT1–CNT2, text block 465) and the cache line may be marked as SBF (text line 470). For example, the marking may done by updating the state of status bits ECN1 and ENC0 of the corroded cache line, by writing the value "0008" to the "Model specific" field of the report register and by writing the value "100E" to the "MCA-COD" field of the report register (e.g., report register 300).

Although the scope of the present invention is not limited in this respect, for example, a write after reading and correcting the corrected cache line for the third time may done (text block 475). If a third time correction of a bit of the cache line may occur (decision block 480) for example, at time T6, the report of the third time correction to the report register may be disabled (text block 485). An update of the ESER_CNT counter may be also disabled (text block 490).

According to embodiments of the present invention, the operations of writing and reading lines of a cache memory, detecting and correcting bit failures in a cache memory line, updating the status bits of the cache line, updating counters and fields of a report register, updating counters of an SBF counters register and disabling the updating and reporting of the registers and the status bits for a third time correction of cache memory line after a second time write to a corrected cache line and/or after repeated corrections to the corrected cache line after a first write may be done do for example by a bit fail reporting unit of 190 of main processing unit 110, if desired.

Figure 6:
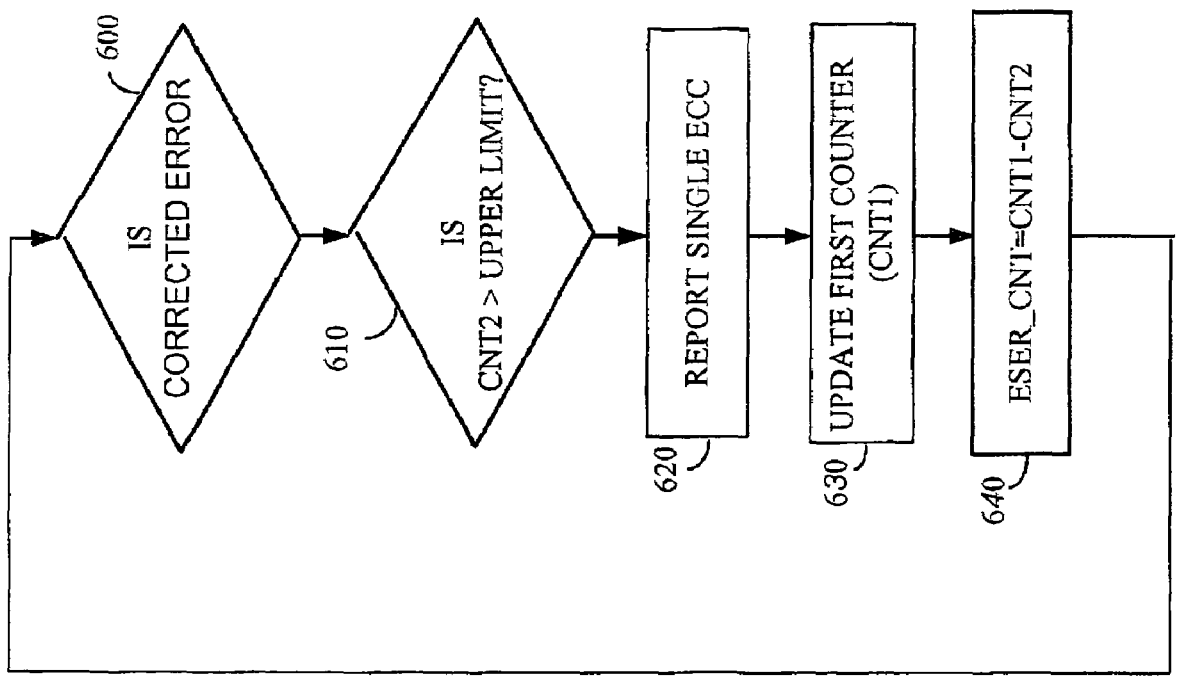
FIG. 6 is a schematic flowchart of a method of reporting a single bit fail in a memory line according to exemplary embodiments of the invention.

Turning to FIG. 6 and FIG. 7. FIG. 6 is a method to update a counter of a single bit fix (SBF) according to exemplary embodiments of the invention. FIG. 7 is a time table 700 to reflect changes in time in the status of registers according to exemplary embodiments of the present invention, helpful in demonstrating the method of FIG. 6.

According to an exemplary embodiment of the invention, table 700 may show cache line status bits ECN0 and ECN1 (e.g., bits 240, 245), a report register (e.g., CACHE_MC_STATUS register 300) having counters, flags, status and/or information fields, and an SBF count register (e.g. SBF count register 310).

According to this exemplary embodiment, SBF count register may include counters CNT1 and CNT2. The first counter CNT1 may count the total number of ECC corrections of bits in the cache memory lines. The second counter, CNT2 may count the total number of reported as defected cache memory lines. For example, line reported as SBF, until the count may exceed a threshold value, for example, a value of 127.

According to the method of FIG. 6, if a read operation and correction operation to a corrected line are performed (decision block 600), and if the upper limit of SBF has exceeded the threshold, for example, if the value of counter CNT2 is equal to 127 (decision block 610), then for each write operation to the error corrected cache line, for example, at times T502, T504, T507, T509 of table 700, the correction of the write operation may be reported as a single ECC (text block 620). For example, the number of defected cache memory line after the threshold exceeded may be reported. In addition, an update of the first counter (e.g., CNT1) may be done (text block 630). The value of the ESER_CNT counter may be updated according to ESER_CNT=CNT1−CNT2 (text block 620), if desired. Furthermore, at the report register, the ESER_CNT counter may count the number of corrections that have been made to the memory lines after the threshold is exceeded.

According to embodiments of the invention, the method may be repeated for each cycle of write, read and correction of the cache line as is shown at a time T503 to T509 of table 700. According to this example, the ESER_CNT counter may count the errors after the SBF threshold is exceeded. The CNT1 counter may count the total number of the SBF errors, although the scope of the present invention is in no way limited in this respect.

While certain features of the invention have been illustrated and described herein, many modifications, substitutions, changes, and equivalents will now occur to those skilled in the art. It is, therefore, to be understood that the appended claims are intended to cover all such modifications and changes as falls within the true spirit of the invention.

What is claimed is:

1. A method comprising:
   updating first and second counters of a first register for a first time and a second time correction of bit failure in a line of a memory based on first and second status bits of the line of the memory;
   disabling an update of the first and second counters of the first register after a third time correction of bit failure in the line; and
   disabling an update of the first and second status bits of the line of the memory by writing a predetermined value to an at least one field of a second register.

2. The method of claim 1, wherein updating the first and second counters comprises:
   writing for a first time to the line and updating the first counter;
   reading and correcting a bit failure in the line for a first time to provide a corrected line; and
   writing for a second time to the line and updating the second counter.

3. The method of claim 2, comprising:
   reading and correcting a bit failure in the corrected line for a second time;
   writing for a third time to the corrected line; and
   disabling the update of the first and second counters.

4. The method of claim 2, comprising:
   disabling the update of the first and second counters when repeating reading and correcting the corrected line after the first time writing to the line.

5. The method of claim 2, comprising:
   disabling a report on a repeated reading and correcting of the corrected line after the first time writing to the line.

6. A main processing unit comprising:
   a memory having two or more lines, wherein a line includes a plurality of data bits and first and second status bits to report a correction of failure in an at least one data bit of the line;
   a first register, operably coupled to the memory, having at least a first counter to count corrected errors happening for a first time in the line based on the first and second status bits and a second counter to count an error correction happening for a second time in the line; and
   a second register operably coupled to the first register to report a number of corrections of the line according to the first and second status bits.

7. The main processing unit of claim 6, comprising:
   a bit fail reporting module to update the first and second counters of the first register according to the first and second status bits, and to disable the update of the first and second counters of the first register after a third time correction of bit failure in the line and to disable an update of the first and second status bits of the line of the memory by writing a predetermined value to an at least one field of the second register.

8. The main processing unit of claim 7, wherein the bit fail reporting module is able to updated the first counter after writing for a first time to the line, to update the second counter after writing for a second time to the line and to update the second counter after the second time correction of the bit failure in the line.

9. The main processing unit of claim 7, wherein the bit fail reporting module is able to disable an update of the first and second counters after writing for a third time to a second time corrected line.

10. The main processing unit of claim 9, wherein the bit fail reporting module is able to disable the update of the first and second counters when repeating reading and correcting to a first time corrected line after the first time writing to the line.

11. The main processing unit of claim 10, the bit fail reporting module is able to disable a report on a repeated reading and correcting of the first time corrected line after the first time writing to the line.

12. The main processing unit platform of claim 9, wherein the bit fail reporting module is able to update the second counter according to the number of corrections to the lines of the memory after the first counter exceeded a predetermined threshold.

13. A computer system comprising:
a wireless network interface card to provide a connection to a network; and
a main processing unit including:
   a memory having two or more lines, wherein a line includes a plurality of data bits and first and second status bits to report a correction of failure in an at least one data bit of the line;
   a first register, operably coupled to the memory, having at least a first counter to count corrected errors happening for a first time in the line based on the first and second status bits and a second counter to count an error correction happening for a second time in the line; and
   a second register operably coupled to the first register to report a number of corrections of the line according to the first and second status bits.

14. The computer system of claim 13, wherein the main processing unit comprises:
a bit fail reporting module to update the first and second counters of the first register according to the first and second status bits, and to disable the update of the first and second counters of the first register after a third time correction of bit failure in the line and to disable an update of the first and second status bits of the line of the memory by writing a predetermined value to an at least one field of the second register.

15. The computer system of claim 14, wherein the bit fail reporting module is able to update the first counter after writing for a first time to the line, to update the second counter after writing for a second time to the line and to update the second counter after the second time correction of the bit failure in the line.

16. The computer system of claim 14, wherein the bit fail reporting module is able to disable an update of the first and second counters after writing for a third time to a second time corrected line.

17. The computer system of claim 16, wherein the bit fail reporting module is able to disable the update of the first and second counters when repeating reading and correcting to a first time corrected line after the first time writing to the line.

18. The computer system of claim 17, wherein the bit fail reporting module is able to disable a report on a repeated reading and correcting of the first time corrected line after the first time writing to the line.

19. The computer system of claim 16, wherein the bit fail reporting module is able to update the second counter according to the number of corrections to the lines of the memory after the first counter exceeded a predetermined threshold.

20. An article comprising: a storage medium having stored thereon instructions that when executed result in:
updating first and second counters of a first register for a first time and a second time correction of bit failure in a line of a memory based on first and second status bits of the line of the memory;
disabling an update of the first and second counters of the first register after a third time correction of bit failure in the line; and
disabling an update of the first and second status bits of the line of the memory by writing a predetermined value to an at least one field of a second register.

21. The article of claim 20, wherein the instruction of updating the first and second counters when executed results in:
writing for a first time to the line and updating the first counter;
reading and correcting a bit failure in the line for a first time to provide a corrected line; and
writing for a second time to the line and updating the second counter.

22. The article of claim 21, wherein the instructions when executed result in:
reading and correcting a bit failure in the corrected line for a second time;
writing for a third time to the. corrected line; and
disabling the update of the first and second counters.

23. The article of claim 21, wherein the instructions when executed result in:
disabling the update of the first and second counters when repeating reading and correcting the corrected line after the first time writing to the line.

24. The article of claim 21, wherein the instructions when executed result in:
disabling a report on a repeated reading and correcting of the corrected line after the first time writing to the line.

25. The article of claim 20, wherein the instructions when executed result in:
counting a number memory lines reported as defected lines until exceeding a threshold; and
reporting a number of defected lines after the threshold exceeded.

* * * * *

UNITED STATES PATENT AND TRADEMARK OFFICE
CERTIFICATE OF CORRECTION

PATENT NO. : 7,590,913 B2 Page 1 of 1
APPLICATION NO. : 11/320496
DATED : September 15, 2009
INVENTOR(S) : Kurts et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 867 days.

Signed and Sealed this

Twenty-first Day of September, 2010

David J. Kappos
*Director of the United States Patent and Trademark Office*